April 14, 1931.   J. SEARS   1,800,410
SAFETY DEVICE FOR MOTION PICTURE PROJECTORS
Filed Oct. 23, 1929   3 Sheets-Sheet 1
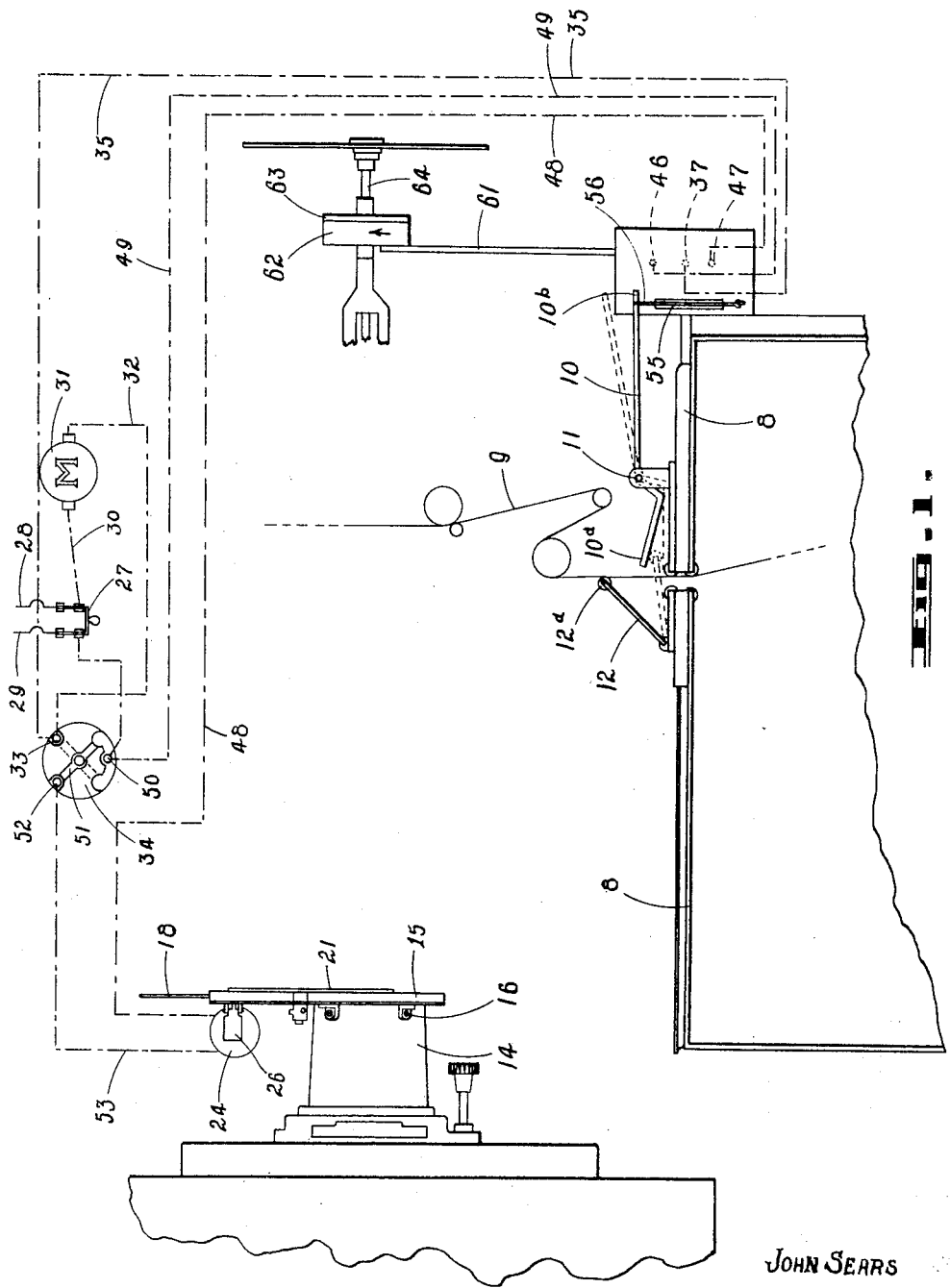
JOHN SEARS
INVENTOR.
BY *Harold C. Shipman*
ATTORNEYS.

April 14, 1931.  J. SEARS  1,800,410
SAFETY DEVICE FOR MOTION PICTURE PROJECTORS
Filed Oct. 23, 1929  3 Sheets-Sheet 2
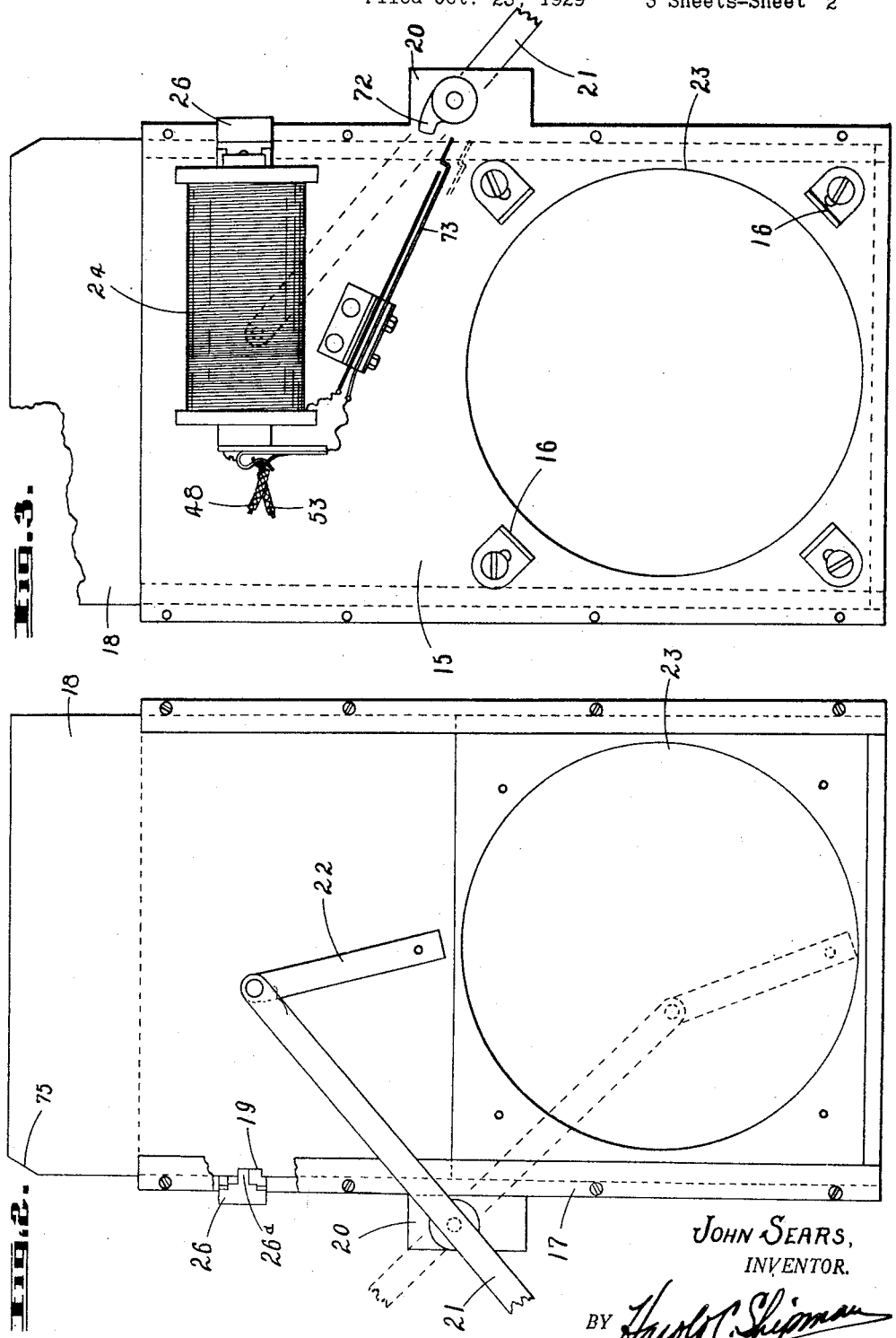
John Sears,
INVENTOR.
BY Harold C. Shipman
ATTORNEYS.

April 14, 1931. J. SEARS 1,800,410
SAFETY DEVICE FOR MOTION PICTURE PROJECTORS
Filed Oct. 23, 1929 3 Sheets-Sheet 3
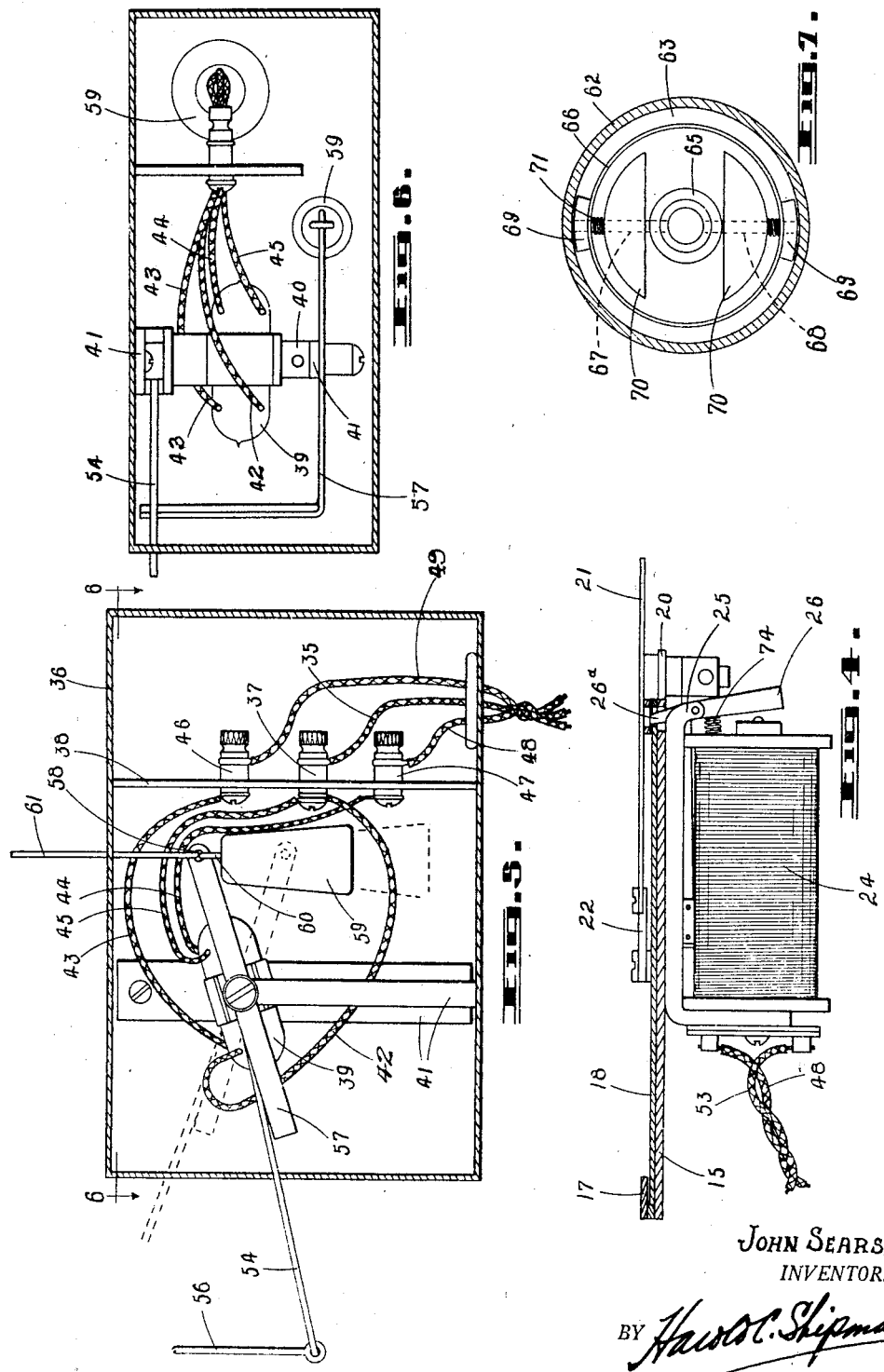
John Sears,
INVENTOR.
BY Harold C. Shipman
ATTORNEY.

Patented Apr. 14, 1931

1,800,410

UNITED STATES PATENT OFFICE

JOHN SEARS, OF REGINA, SASKATCHEWAN, CANADA

SAFETY DEVICE FOR MOTION-PICTURE PROJECTORS

Application filed October 23, 1929, Serial No. 401,922, and in Canada October 15, 1929.

This invention relates to a safety device for motion picture projectors and the primary object is to provide a shutter which will automatically close off the light projection through the film should the latter break or for any reason be stopped or slowed down from its ordinary speed of travel. Ignition of the film is often caused when the film is slowed down or stopped and a portion of the same is unduly subjected to the intense heat of the concentrated rays of light emanating from the projector.

With the foregoing and other objects in view as will appear as the description proceeds, the invention consists of the novel construction, combination and arrangement of co-operating elements as hereinafter more specifically set forth, claimed and shown in the accompanying drawings forming a part of the present application, in which:

Fig. 1 is a schematic view of the general layout disclosing the adaptation of my invention to a motion picture projector and showing the various circuits and controlling means in connection therewith.

Fig. 2 is a front plan view of the shutter and associate parts.

Fig. 3 is a rear plan view of the shutter disclosed in Fig. 2.

Fig. 4 is a transverse sectional view taken on the line 4—4 of Fig. 3, the magnetic coil and parts in combination therewith being shown in full.

Fig. 5 is a sectional view of the mercury switch-box.

Fig. 6 is a transverse sectional view of the mercury switch-box, taken on the line 6—6 of Fig. 5.

Fig. 7 is a transverse sectional view of the governor means.

Like numerals of reference designate corresponding parts throughout the different views.

8 is a base on which the mechanism for controlling the travel of the film 9 is suitably mounted, the film 9 passing over certain guide rollers during its travel from one film spool to the other. Mounted on the base 8 is a lever 10, fulcrumed as at 11. The end 10$^a$ is normally spaced from the base as shown in full lines in Fig. 1, which end, when moved downwardly, will cause the opposite end 10$^b$ to be moved upwardly as shown in dotted lines in Fig. 1, the purpose of which will be noted hereinafter. 12 is a trip arm pivotally mounted on the base 8 and is provided at its free end with a roller 12$^a$. When the film 9 is being threaded through the various guide rollers, this trip arm 12 is positioned in such a manner that the roller on the free end thereof bears against the film in a leaning position. If the film breaks or sags, the roller 12$^a$ on the free end of the trip arm 12 is of sufficient weight to cause the arm 12 to drop, the roller 12$^a$ forcing the free end 10$^a$ of the lever 10 to the position shown in dotted lines in Fig. 1.

14 is the light projector on which the safety shutter is mounted. This safety shutter is composed of a frame 15 having adjustably positioned mounting brackets 16 by which it may be attached to the projector 14. Preferably on the outside of the frame 15, I provide guide strips 17 for the shutter 18. One side of the shutter 18 is provided with a notch 19. The frame 15 has an outwardly projecting side portion 20 on which the lever 21 is pivotally mounted, which lever is connected to the shutter 18 by the connecting link 22 so that on downward movement of the outer free end of the lever 12, the shutter will be raised to normal position, so as to permit projection of light rays through the opening 23 in the frame 15. Mounted on the frame 15 is a magnetic coil 24. Supported in combination with the magnetic coil 24 is a bracket 25. Pivotally mounted in the bracket 25 is a control arm 26, one end of which is designed to be attracted towards the coil upon energization of the same. On looking at Fig. 2, this control arm 26 is shown with its reduced end 26$^a$ as being engaged in the notch 19. When the large end of the control arm 26 is actuated towards the magnetic coil 24, the reduced end 26$^a$ will be disengaged from the notch 19, which will permit the shutter 18 to drop and close over the opening 23.

Referring to the circuits and electrical hook-up, 27 is a main-switch from the electrical supply conductors, positive 28 and negative 29. The electrical current flows from the main-switch 27, through the conductor 30 to the motor 31, which motor is used for operating the various apparatus through gears and mechanism which are common to the motion picture reproduction and which are not shown in the present drawings, as they do not form a part of the present invention. The current after passing through the motor 31 travels through the conductor 32 to the post 33 of the operator switch 34. Connecting to this post 33 is the conductor 35, which conductor extends to the mercury switch-box 36 and is connected to the binding post 37, which binding post is mounted on the insulation panel 38. 39 is the mercury switch rockably mounted in combination with the shaft 40 on the supporting members 41. The mercury switch 39 has lead conductors 42, 43, 44 and 45, the former two terminating inside one end of the mercury switch while the latter two terminate in the opposite end. The opposite ends of the conductors 42 and 45 are both connected to the binding post 37, while the end of the conductor 43 is connected to the binding post 46 and the end of the conductor 44 is connected to the binding post 47 which binding post may be mounted on the panel 38. A conductor 48 extends from the binding post 47 to one side of the magnetic coil 24, while the conductor 49 extends from the binding post 46 to the post 50 of the operator switch. The knife 51 of the operator switch 34 makes, through the mechanism of the switch, a connection between the post 50 and the post 52. 53 is a conductor connected between the other side of the magnetic coil 24 and the post 52 of the operator switch 34.

Mounted on the shaft 40 in fixed relationship with the mercury switch 39 is an arm 54. The end of this arm extends out through a slot 55 in the mercury switch-box 36 and the link 56 connects the end of this arm 54 to the end 10ᵇ of the rocker lever 10. Pivotally mounted on the shaft 40 is the arm 57. One end of this arm 57 is bent at right angles to the body portion thereof and extends across with the free end thereof under the arm 54, (see Fig. 6). The opposite end of the arm 57 is provided with an opening 58. The weight 59 is suspended from the arm 57 by means of the link 60 engaged through the opening 58. 61 is a connecting rod, one end of which is connected to the arm 57 through the opening 58. The other end of this connecting rod 61 is connected to the outer casing 62 of the governor. The portion 63 of the governor is fixedly connected to the shaft 64, while the outer casing 62 is freely mounted thereon. This shaft 64 is mounted in a bracket suitably supported from the film guide mechanism. 65 is the central hub of the portion 63 of the governor. Integral with the portion 63 and extending inwardly therefrom is an annular rim 66. 67 and 68 are pins reciprocally mounted through the annular rim 66 and extending into the hub portion 65. Formed on the outer end of these pins 67 and 68 are friction contact heads 69. 70 are weights fixedly attached to the pins 67 and 68 between the hub 65 and the rim 66. Positioned on the pins 67 and 68 between the weights 70 and the rim 66 are coil springs 71. The outer casing 62 extends over the friction heads 69 and upon rotation of the shaft 64 centrifugal force causes the weights 70 to expand outwardly towards the annular rim 66, carrying with them the respective pins 67 and 68 which in turn carry the heads 69 into frictional contact with the rim part of the outer casing 62. When the shaft 64 is rotating at a normal speed the friction set up within the governor mechanism, just hereinbefore described, will tend to rotate the outer casing 62 in the direction of the arrow shown thereon. This friction will normally keep the connecting rod 61, arm 57 and the weight 59 in raised position as shown in Fig. 5.

If for any reason the rotary motion of the shaft 64 is reduced or stopped, the reduced frictional engagement of the governor will allow the weight 59 to drop, actuating the arm 57. The bent portion of the arm 57, being under the lever 54, upon actuation of the same will raise the arm 54 and the mercury switch 39 will be rocked to the opposite position as shown in dotted lines in Fig. 5 thereby forming a connection between the conductors 44 and 45. This rocking of the mercury switch 39 will cause the current to flow to the magnetic coil 24 to release the shutter 18.

From the foregoing description, it will be readily understood that the shutter will be operated independently by the slackening or breakage of the film 9 or by cessation of operation of the projector mechanism or of the slowing up of the same. It will also be appreciated that the rays from the light projector 14 will only emanate therefrom while the film 9 is in proper taut position and travelling at a normal rate of speed.

When breakage of the film, slowing up of the mechanism or any of the usual trouble takes place wherein the film is in danger of igniting and the shutter is operating, the lug 72 carried in fixed relationship to the lever 21 will move in an arcual path of travel, contacting with the under portion of the make and break contact 73, thus breaking the circuit which carries the current through the magnetic coil 24 and at the same time breaking the circuit to the motor 31. This automatic shutting off of the motor prevents further complications which might be occasioned when the film breaks or slackens.

After the operator has made the necessary repairs, the lever 21 may be moved from the position as shown in dotted lines Fig. 2 to the position as shown in full lines to allow re-projection through the opening 23. Supported between the control arm 26 and the magnetic coil 24 is an expansion coil spring 74 which, when the shutter 18 is being raised, will cause the end 26ª of the control arm 26 to snap back into engagement in the notch 19. The upper corner of the shutter 18 is bevelled off as at 75 so that when the shutter is being raised, the end 26ª of the control arm 26 will be forced outwardly to allow the shutter to be raised until the notch 19 registers opposite the end 26ª.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

A safety device for motion picture projectors, comprising a frame adapted to be mounted on a motion picture projector apparatus and provided with an opening through which the light rays from said projector apparatus may emanate; a shutter movable in said frame; a lever for moving said shutter to open position; a means for retaining said shutter in open position, the release of said means being by a magnetic control; a rockably mounted mercury switch; a lever, the operation of which is controlled by the speed governor of said projector apparatus, for rocking said mercury switch; an arm, for independently rocking said mercury switch; a means for automatically operating said arm upon the slackening or breaking of the film passing through said projector apparatus; a motor for operating said projector apparatus and circuits between said motor, said mercury switch and said magnetic control whereby the electrical circuit flow will be through said motor when said mercury switch is in normal position but will be broken upon the releasing and closing of said shutter, said shutter being released upon energization of said magnetic control caused upon the rocking of said mercury switch by said arm.

In testimony whereof, I affix my signature.

JOHN SEARS.